I. L. DARBY & G. H. SMITH.
SPADING MACHINE.
APPLICATION FILED SEPT. 16, 1915.
1,224,717.
Patented May 1, 1917.
4 SHEETS—SHEET 4.
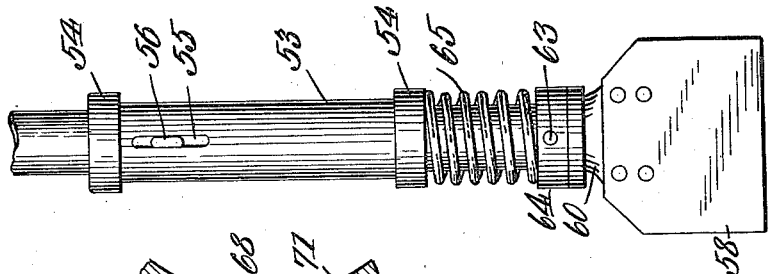
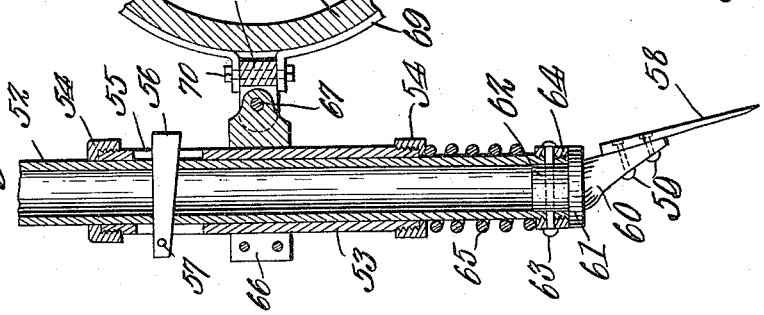
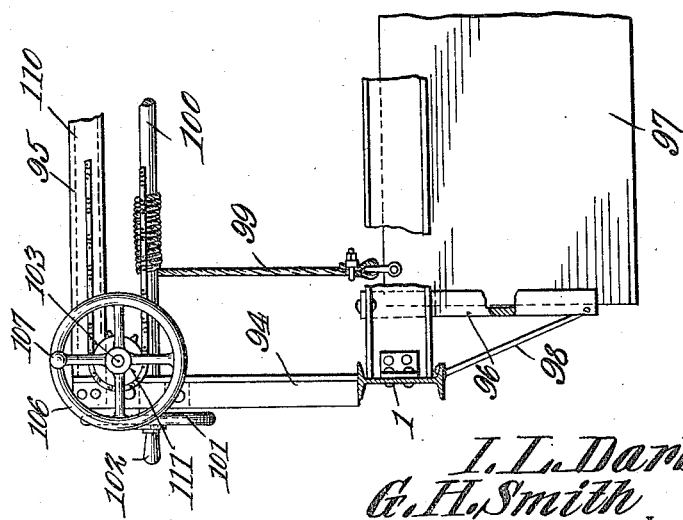
WITNESSES:
I. L. Darby and
G. H. Smith
INVENTORS
BY
Attorney.

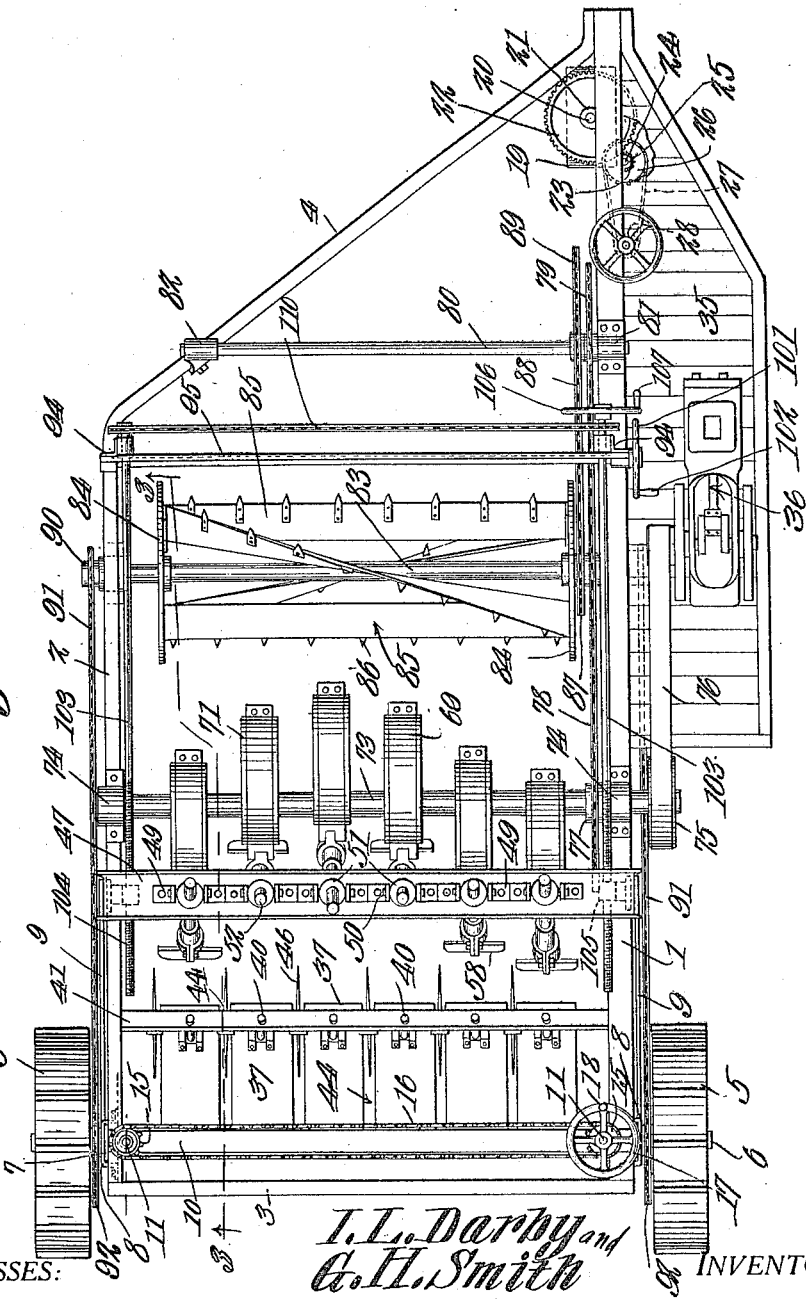

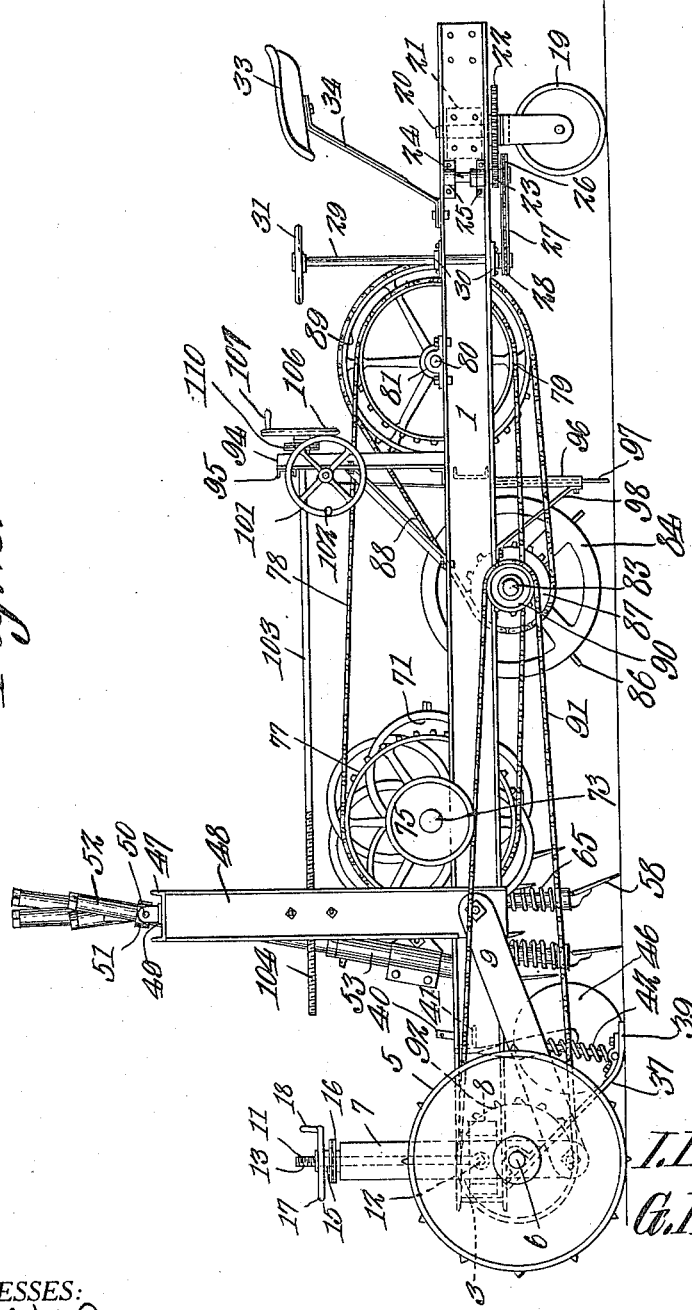

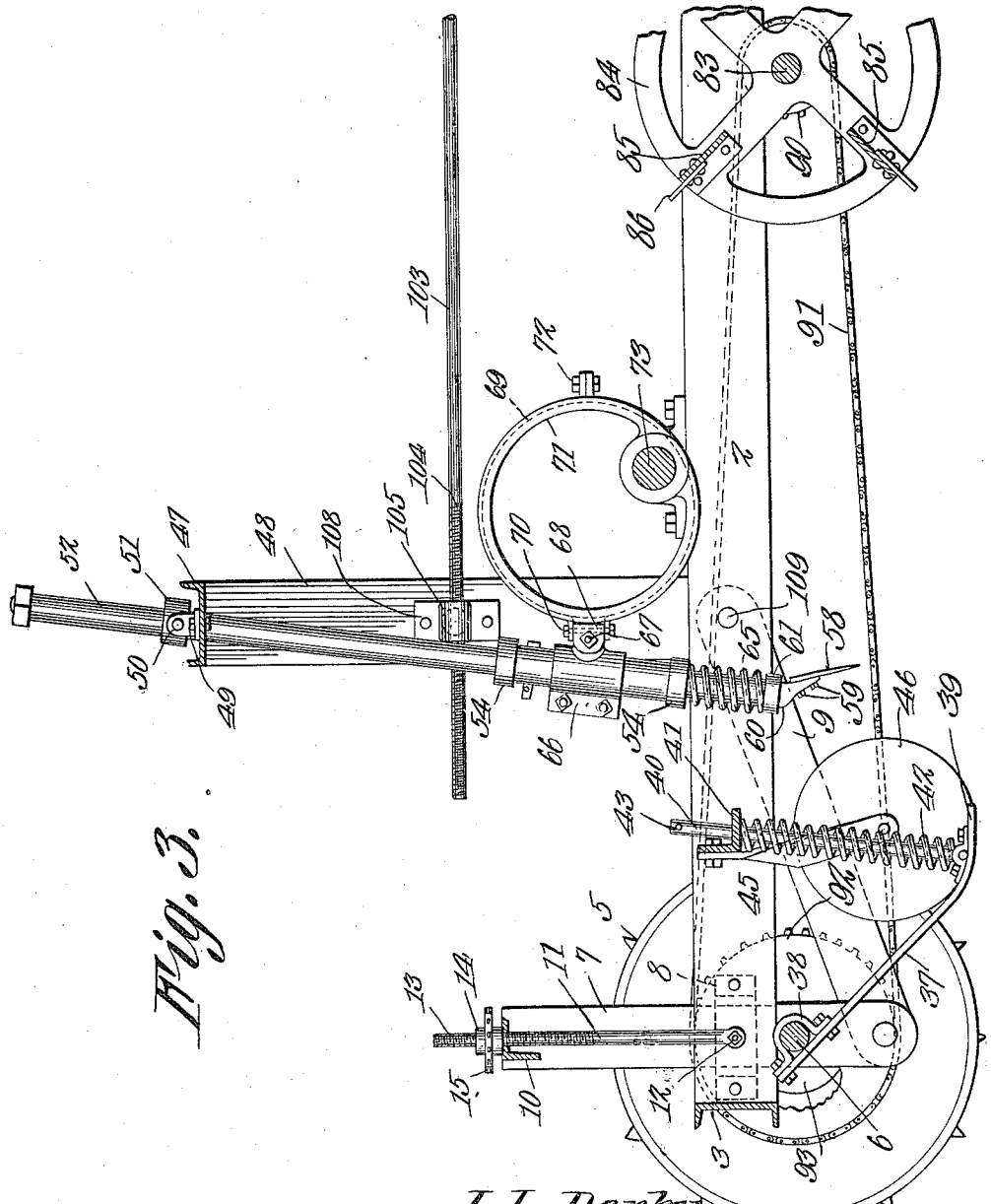

UNITED STATES PATENT OFFICE.

ISAAC L. DARBY, OF GREELEY, COLORADO, AND GEORGE H. SMITH, OF COLUMBUS, OHIO.

SPADING-MACHINE.

1,224,717.  Specification of Letters Patent.  Patented May 1, 1917.

Application filed September 16, 1915. Serial No. 51,041.

*To all whom it may concern:*

Be it known that we, ISAAC L. DARBY and GEORGE H. SMITH, citizens of the United States, residing, respectively, at Greeley, county of Weld, State of Colorado, and Columbus, in the county of Franklin and State of Ohio, have invented a new and useful Spading-Machine, of which the following is a specification.

This invention has reference to spading machines, and its object is to provide a machine which is capable of producing a proper seed bed; that is, to bring about the fine granular condition of the ground desirable for a good seed bed, and which has heretofore been attempted by the separate operations of plowing and harrowing without however the full attainment of the desired result.

In accordance with the present invention the soil is tilled by means of a spading tiller, whereby the surface of the ground is cut to an appropriate depth with the vegetation flattened down, and then the cut ground is subjected to the action of spading tools which lift and throw the ground in a manner to more or less disintegrate it, such disintegration being supplemented by suitable mechanism causing a pulverization of the soil and the production of a fine even bed appropriate for the reception of seed.

The operation is quite different from that of a plow, which latter cuts, lifts, breaks and turns the soil, while the spading tiller of this invention enters and lifts the ground or soil in like manner to a hoe, so that the disturbed soil is, when lifted by the spades, in the form of chips that are broken up by being thrown against a rotatable pulverizer and packer, by which the chips or lumps of soil are beaten fine and thoroughly mixed.

In the treatment of the soil by a plow it is necessary to follow the plow with other tools in the production of a seed bed, while with the present invention the entire operation is performed at one time by a single machine, operating to the full depth and full width desired, the machine operating successfully even on heavy soils.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the drawings:—

Figure 1 is a plan view of a machine constructed in accordance with the present invention.

Fig. 2 is a side elevation of the structure of Fig. 1 with the driving engine omitted.

Fig. 3 is a section on the line 3—3 of Fig. 1, but omitting some distant parts and drawn on a larger scale than Fig. 1.

Fig. 4 is a detail elevation of a fragment of the leveling device following the pulverizer.

Fig. 5 is a detail section longitudinally of one of the spades and showing its connection to the corresponding spade operating cam.

Fig. 6 is an elevation of the spade at right angles to the showing of Fig. 5 and omitting the connecting member to the operating cam.

Referring to the drawings there is shown a main frame made up of longitudinal beams 1, 2, a front cross beam 3 and an angle continuation 4 of the side beam 2 bent at an angle to the length of the beam 2 and continued to the rear end of the beam 1 and there fastened to said beam 1.

In the practical embodiment of the invention the main frame may be provided with a suitable number of braces to stiffen it, but such devices are omitted in the drawings to avoid confusion in illustration, since the invention is not dependent upon any particular construction of main frame.

At that end of the main frame provided with the cross beam 3 there are bull or traction wheels 5 on opposite sides of the frame 1 and since the machine is assumed to travel with the bull wheels forwardly, such end of the machine may be termed the front end. The wheels 5 are mounted on an axle 6 carried by uprights 7 movable up and down through holding clips 8 fast to the respective side beams 1 and 2. The uprights 7 are in the nature of posts each pivotally connected at the lower end to one end of a link 9 with the link joined to the respective beam 1 or 2, as the case may be, at a suitable distance to the rear of the front of the machine, whereby the main frame may be elevated or lowered with respect to or along the posts or uprights 7 for a limited extent. The upper ends of the posts are joined by a beam 10, shown as an angle beam, but which, of course, may be of any suitable shape, and near the ends of the beam 10 it is traversed by rods 11 pivotally connected at the lower ends, as shown at 12, to the respective beam 1 or 2, as the case may be, while the upper end of each rod 11 is screw-threaded, as indicated at 13, and has a nut 14 applied to it, which nut constitutes the hub of a sprocket wheel 15. There being two rods 11 there are, therefore, two sprocket wheels 15 arranged on opposite sides of the machine, and these sprocket wheels are joined by a sprocket chain 16, so that they may be simultaneously moved in the same direction. One of the sprocket wheels has a hand wheel 17 fast to its hub portion 14, and this hand wheel is provided with a handle 18 by means of which the hand wheel may be readily turned either by the handle 18 or by the rim of the wheel.

The weight of the main frame of the machine and parts carried thereby is sustained at the forward end by the links 11 and uprights 7, which latter are carried by the axle 6 with the axle upheld by the wheels 5. By turning the hand wheel 17 in the appropriate direction the main frame is raised or lowered with respect to the ground to any desired extent, but with the sides of the frame moving alike in the adjustments of the frame.

In the particular arrangement shown in the drawings the main frame tapers at the rear end toward one side and at the narrow extremity is sustained by a steering wheel 19 carried by a post 20 in a journal bearing 21 fast to the beam 1 or other appropriate part of the frame. The post 20 has a gear wheel 22 fast thereto, and this gear wheel is in mesh with a pinion 23 provided with a shaft 24 having journal bearings 25 on the beam 1. The shaft 24 of the pinion 23 carries a sprocket wheel 26 connected by a sprocket chain 27 to a sprocket pinion 28 on a rotatable upright stem 29 having journal bearings 30 on the beam 1 and provided on its upper end with a manipulating wheel 31. By turning the wheel 31 and thereby turning the upright or steering post 29, movement is imparted to the sprocket pinion 28 and from the latter by way of the sprocket chain 27 to the sprocket wheel 26. By this means motion is imparted to the pinion 23 and from the latter to the gear wheel 22, thus turning the steering wheel 19 to one side or the other. The steering is accomplished through motion multiplying connections so that but little effort is required on the part of the operator to control the steering. It will be understood of course that the steering mechanism shown and described may be replaced by other known forms of steering mechanisms capable of similar action. In the complete machine it is customary to provide an operator's seat 33 upon a support 34 rising from the beam 1 so as to be within reach of the steering wheel 31, and if desired within reach of other manipulating members for other purposes to be described, or in the event of the employment of more than one operator for the machine, the other manipulating members may be located within easy reach of the second operator, wherefore the duties of the first operator may be confined to those of steering the machine.

To contribute to the balancing of the steering end of the machine where the steering wheel is located at one side of the center line of the machine, as in the showing of Fig. 1, there is provided a platform 35 extending lengthwise of the beam 1 and secured to the latter on that side of the beam remote from the beam 2. The platform 35 is designed to carry an engine 36 which may be in the form of an explosion engine, such as is commonly employed in farm machinery for driving purposes. Since a particular type of power generating device is not obligatory, no special type is shown, so that while the showing of the power device is generally that of an explosion engine, it will be understood that other types of power devices may be employed, wherefore the power device 36 will be simply designated as a prime mover.

Carried at one end by the axle 6 is a series of pressing plates 37. Each plate may be a steel plate secured at the forward end to the axle 6 by a clip 38 constituting a pivotal connection with the axle 6. The series of plates extends crosswise of the machine, each in trailing relation to the axle 6, with the end of the plate remote from the axle 6 bent end of the plate in a gentle curve to provide a pressing foot 39 adjacent to the ground, it being understood that the plates slant downwardly from the axle 6 toward the foot end 39. Each plate has a rod 40 pivoted at one end thereto, the rod rising from the foot end of the plate and moving freely through one web of an angle beam 41 fast at the ends to the side beams 1 and 2. Between the pressing foot 39 and the beam 41 each rod 40 is surrounded by a helical spring 42 tending to move the foot 39 toward the ground, but yielding to superior pressure. Each rod 40 is prevented from escaping from the plate 41 by a cross pin 43 at its upper end.

The plates 37 are spaced apart a short distance in the direction of the width of the machine, such spacing being indicated at 44 in Fig. 1. Fast to the beam 41 is a series of depending yokes 45 each carrying a rotary cutting disk 46. These disk cutters enter the spaces 44 between the foot ends 39 of the presser plates 37 and are so located that when the machine is properly adjusted as to the height of the main frame from the ground, the cutters 46 enter the ground to an appropriate extent and, therefore, divide the surface of the ground into narrow strips in width agreeable to the distance between the cutters 46. Any vegetation or other matter which may be on the surface of the ground is pressed down flat against the surface of the ground between the cutters by the presser feet 39, the degree of pressure employed corresponding to the strength of the springs 42.

To the rear of the beam 41 is a bridge beam 47 elevated at an appropriate height above and supported from the side beams 1 and 2 by terminal uprights 48 rising from the respective beams 1 and 2. The beam 47 and the uprights 48 may be in the form of a single channel beam, but the bridge represented by the beam 47 and its end supports 48 may be otherwise constructed than in the form of a channel beam. On top of the beam 47 pairs of spaced ears 49 are secured, and mounted between each pair of ears by pivot pins or trunnions 50 is a collar 51. Slidably mounted in each collar 51 is a tubular rod or bar 52 rising above the collar 51 and projecting through the beam 47 toward the main frame. The tubular member 52 which is made hollow for the sake of lightness constitutes a stem of a spading device. The stem 52 has a generally upright position on the main frame, but is capable of moving longitudinally through the collar 51 and of oscillating about the axis of the pivot pins 50. Near the lower end of each stem 52 it is surrounded by a sleeve 53 through and beyond both ends of which it extends. The sleeve 53 is provided with screw caps 54 at opposite ends and near what may be termed the upper end of the sleeve 53 the latter is provided with longitudinally extended diametrically opposite slots 55 traversed by a pin 56 also traversing the stem 52. The pin 56 may be in the form of an elongated taper wedge driven tightly through the stem 52 and at its smaller end traversed by a pin 57 designed to prevent loss of the pin 56 should it become loosened. The pin 56 is capable of moving lengthwise of the slots 55, whereby the movement of the sleeve 53 on the stem 52 or the movement of the stem 52 lengthwise of the sleeve 53 is limited.

Each stem 52 carries a spading or shovel blade 58 made fast by rivets 59 or otherwise to a shank 60 terminating in a collar 61 and stem 62 projecting axially therefrom. The stem 62 is fitted to the lower end of the hollow stem 52 and is there held by a pin 63 traversing both stems 52 and 62 and a strengthening collar 64 exterior to the lower end of the stem 52 on to which latter the collar 64 may be screwed. Between the head 54 and collar 64 the stem 62 is surrounded by a spring 65 designed to yield for a limited distance to the impact of the spade blade 58 with the ground, so that when the spade engages the ground in a manner to be described, such engagement is of a yielding nature.

Embracing each sleeve 53 is a clip 66 pivotally connected by a bolt 67 or otherwise to a block 68 to which latter the corresponding ends of a divided eccentric strap 69 are secured by bolts 70. The strap 69 encircles an eccentric 71, while those ends of the two members of the divided strap remote from the bolts 70 are connected by other bolts 72.

There are as many spades 58 as there are presser plates 37 and the spades are arranged in line with the presser plates 37. There are as many eccentrics 71 as there are spades and these eccentrics are all mounted on a shaft 73 having journal bearings 74 carried by the beams 1 and 2. The shaft 73 extends beyond that side of the beam carrying the platform 35 and there has a pulley 75 fast to it, the pulley receiving motion from the prime mover 36 by means of a belt 76.

Fast on the shaft 73 is a sprocket wheel 77 connected by a sprocket chain 78 to another sprocket wheel 79 on a shaft 80 mounted at one end in a journal bearing 81 on the beam 1 and at the other end in a journal bearing 82 on the diagonal extension 4 of the beam 2.

Mounted in suitable journal bearings in the beams 1 and 2 between the shafts 73 and 80 is another shaft 83 carrying heads 84 spaced apart lengthwise of the shaft 83, and these heads are connected by blades 85 set askew with relation to the longitudinal axis of the shaft 83 and provided along their edges with projecting fingers 86. The heads 84, together with the blades 85 and fingers 86, constitute a beating and pulverizing drum to which reference will hereinafter be made. The shaft 83 carries a sprocket wheel 87 driven by a sprocket chain 88 engaging a sprocket wheel 89 on a shaft 80.

At opposite ends of the shaft 83 are sprocket wheels 90 each connected by a sprocket chain 91 to a sprocket wheel 92 connected to the respective bull wheel 5 by any suitable means, whereby on making a curve, for instance, the proper one of the wheels may receive power without driving the other, such structures being in common use in various types of power driven machines. Since various types of clutch mechanisms are employed for such purpose, the presence of such a clutch mechanism is indicated at 93 in Fig. 3, but no attempt is made to show any of the structure of the clutch.

Erected on the beams 1 and 2 to the rear of the beating and pulverizing drum are uprights 94 connected by a cross beam 95, these parts being indicated as formed of structural metal, but, of course, may be of any suitable form. Depending from the beams 1 and 2 are guide channels 96 receiving and guiding the end portions of a scraper plate 97 located close to but behind the pulverizing drum. The channel members 96 are suitably strengthened by brace rods 98. The scraper plate 97 is sustained by ropes or cables 99 near the ends, these cables being wound upon a rod 100 serving the purpose of a drum and journaled at the ends in the uprights 94. That end of the rod 100 toward the platform 35 is continued on the corresponding side of the upright 94, and is there provided with a hand wheel 101 supplied with a handle 102 for the manipulation of the rod to cause the elevation or lowering of the scraper plate 97.

Journaled on each upright 94 is a shaft 103 extending lengthwise of the machine from the upright 94 toward the front of the machine and terminating at the front end in a threaded portion 104 extending through a threaded block 105 fast to the corresponding upright 48. Each shaft 103 adjacent to its bearing in the upright 94 is provided with a hand wheel 106 having a handle 107 thereon.

Each block 105 is swiveled to a corresponding support 108 fast to a corresponding upright 48 and the frame made up of the beam 47 and uprights 48 is pivoted to the respective frame beams 1 and 2 by pivot supports 109 which may at the same time secure the corresponding ends of the links 9 to the beams 1 and 2. The tilting of the frame made up of the beam 47 and uprights 48 is effected by adjustments of the shafts 103 at the will of the operator, these shafts being connected by a sprocket chain 110 extended about sprocket wheels 111 on the shafts 103.

Assuming that the machine is properly adjusted as to the height of the frame from the ground, the position of the spade frame 47, whether upright or tilted, and the position of the scraper plate 97, the machine is driven by the prime mover 36 transmitting power by the belt 76 to the shaft 73 on which shaft the eccentrics 71 are, in the particular showing of the drawings, mounted in progressive axially shifted positions, so that these cams will actuate the spades in like order. At the same time power is transmitted from the shaft 73 by way of the sprocket chain 78 to the shaft 80 and the latter through the sprocket chain 88 drives the shaft 83. Motion is transmitted to the bull wheels 5 by the sprocket chains 91 connecting the shaft 83 with the sprocket wheels 92 and the machine moves forwardly under the power thus provided. The machine is steered by means of the steering wheel 19 in a manner already described.

As the machine travels along the ground, standing vegetation is leveled by means of the pressing feet 39 which are urged toward the ground by the springs 42, but which yield to strong enough obstructions. The soil is sliced into long strips by the cutters 46 arranged on opposite sides of the leveling plates 37 and immediately behind the cutters the soil is subjected to the digging and throwing action of the spades or shovel blades 58, which by means of the rotating cams 71 and because of the pivotal control due to the collars 51 move in elliptical paths toward and into the soil, and then rearwardly and upwardly, severing the long strips cut by the disks 46 into small masses which may be termed clods or chips, similar to the action of a hand hoe. The clods of soil thus lifted and thrown rearwardly engage the revolving pulverizer drum and are finely sub-divided by the action of the blades 85 and teeth 86, so that after the passage of the pulverizing drum the soil is in a finely divided condition well adapted to receive seed. However, the surface of the treated soil is quite uneven, wherefore it is leveled by the passage of the scraper plate 97 thereover.

The result is that by the single operation of a single machine the soil is turned over, finely divided and leveled in a manner similar to but better than the treatment of the soil to the action of a plow and subsequently to the action of a harrow.

What is claimed is:—

1. A spading tiller comprising a vehicle with soil cutting means, vegetation flattening means associated with the soil cutting means, spading means for severing and lifting the cut soil, disintegrating means in the path of the cut soil leaving the spading means, and a leveling blade for the disintegrated soil.

2. A spading tiller comprising a vehicle, a laterally extended series of soil cutting devices carried by the vehicle with said devices spaced apart, a laterally extended series of vegetation flattening devices carried by the vehicle and alternating with the soil cutting devices, a laterally extended series of spading devices in line with the flattening spading devices in the direction of travel, disintegating means in the path of the cut soil leaving the spading devices, and leveling means for the distegrated soil.

3. A spading tiller comprising a vehicle with supporting wheels, soil cutting means carried by the vehicle, vegetation flattening means associated with the soil cutting means, spading devices for severing and lifting the cut soil and following the cutting and flattening means, disintegrating means in the path of the cut soil leaving the spading means, leveling means for the disintegrated soil, and power means on the vehicle connected to the supporting wheels for driving the vehicle and provided with connections to the spading means and disintegrating means for actuating them.

4. A spading tiller comprising a vehicle with soil cutting devices, vegetation flattening devices associated with the soil cutting devices, reciprocatory spading devices for severing and lifting the cut soil, rotary disintegrating means in the path of the cut soil leaving the spading means, and power means on the vehicle for reciprocating the spading devices and rotating the disintegrating means.

5. A spading tiller comprising a vehicle, a laterally extended series of laterally spaced rotary cutters on the vehicle, a laterally extended series of vegetation flattening devices interspersed with the cutters, reciprocatory and oscillatory spading devices for severing and lifting the cut soil and propelling it rearwardly with respect to the direction of travel of the vehicle, and a rotary disintegrator in the path of the cut soil leaving the spading devices.

6. A spading tiller comprising a vehicle, a laterally extended series of laterally spaced rotary cutters on the vehicle, a laterally extended series of vegetation flattening devices interspersed with the cutters, reciprocatory and oscillatory spading devices for severing and lifting the cut soil and propelling it rearwardly with respect to the direction of travel of the vehicle, and a rotary disintegrator in the path of the cut soil leaving the spading devices, said tiller being also provided with a leveling blade located to the rear of the disintegrating means for leveling the disintegrated soil.

7. A spading tiller provided with spading devices and a rotary disintegrator associated with the spading devices to receive soil elevated and discharged therefrom, said disintegrator comprising a skeleton frame extending crosswise of the structure and provided with longitudinal flat blades extending lengthwise of the disintegrator and presenting the blades flatwise to the soil delivered to them.

8. A spading tiller provided with spading devices and a rotary disintegrator associated with the spading devices to receive soil elevated and discharged therefrom, said disintegrator comprising a skeleton frame extending crosswise of the structure and provided with longitudinal flat blades extending lengthwise of the disintegrator and presenting the blades flatwise to the soil delivered to them, said blades each making a partial turn about the axis of the disintegrator from one end of the latter to the other.

9. A spading tiller provided with spading devices and a rotary disintegrator associated with the spading devices to receive soil elevated and discharged therefrom, said disintegrator comprising a skeleton frame extending crosswise of the structure and provided with longitudinal flat blades extending lengthwise of the disintegrator and presenting the blades flatwise to the soil delivered to them, said blades each making a partial turn about the axis of the disintegrator from one end of the latter to the other, and said blades being each provided with projecting fingers.

10. A spading tiller structure comprising a vehicle with a laterally extended series of cutting devices for engaging the ground and dividing the surface thereof into strips, a laterally extended series of spading devices to the rear of and alternating with the cutting devices, and a rotary disintegrator extending laterally of the line of travel of the vehicle and of a length to include all the spading devices, said disintegrator comprising a skeleton drum with longitudinal askew flat blades presenting flat surfaces to the soil elevated by the spading devices and discharged against said blades.

11. A spading tiller provided with soil spading and disintegrating means, and means in advance of the spading means for preparing the soil therefor, comprising a laterally extended series of cutting disks and a laterally extended series of vegetation flattening members interspersed with the cutting disks.

12. A spading tiller provided with soil spading and disintegrating means, and means in advance of the spading means for preparing the soil therefor, comprising a laterally extended series of cutting disks and a laterally extended series of vegetation flattening members interspersed with the cutting disks, each flattening member having a presser foot and yieldable spring means for constraining the presser foot toward the ground.

13. In a spading tiller, spading devices, a rotatable soil disintegrator situated at the rear of and spaced from the spading devices and located in the path of soil thrown from the spading devices, and a leveling blade in the path of soil treated by the disintegrator.

14. In a spading tiller, spading devices, a soil disintegrator in the path of soil delivered from the spading devices, and a leveling blade in the path of soil treated by the disintegrator, said blade having adjusting means operable at will while the tiller is moving for varying the height of the blade with relation to the ground.

15. A spading tiller comprising a vehicle with supporting and steering wheels, means for changing the height of the frame on the vehicle with relation to the ground, soil cutting means on the vehicle, vegetation leveling members carried by the vehicle in association with the soil cutting members, spading devices carried by the vehicle to the rear of and in alternation with the lines of travel of the soil cutting members, a disintegrator on the vehicle to the rear of the spading members in position to receive soil lifted by and discharged from the spading members, a soil leveling means to the rear of the disintegrator, a prime mover on the vehicle, and driving connections from the prime mover to the supporting wheel, spading members and disintegrator.

In testimony, that we claim the foregoing as our own, we have hereto affixed our signatures in the presence of two witnesses.

ISAAC L. DARBY.
GEORGE H. SMITH.

Witnesses:
GEORGE M. HOUSTON,
G. F. BORN.

Copies of this patent may be obtained for five cents each, by addressing the "Commissioner of Patents, Washington, D. C."